US010261584B2

(12) United States Patent
Gill et al.

(10) Patent No.: US 10,261,584 B2
(45) Date of Patent: Apr. 16, 2019

(54) TOUCHLESS USER INTERFACE FOR HANDHELD AND WEARABLE COMPUTERS

(71) Applicant: Rambus Inc., Sunnyvale, CA (US)

(72) Inventors: Patrick R. Gill, Sunnyvale, CA (US); David G. Stork, Portola Valley, CA (US); Thomas Vogelsang, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 65 days.

(21) Appl. No.: 15/234,141

(22) Filed: Aug. 11, 2016

(65) Prior Publication Data
US 2017/0060242 A1 Mar. 2, 2017

Related U.S. Application Data

(60) Provisional application No. 62/235,450, filed on Sep. 30, 2015, provisional application No. 62/209,169, filed on Aug. 24, 2015.

(51) Int. Cl.
*G06F 3/042* (2006.01)
*G06F 3/01* (2006.01)
*G06F 1/16* (2006.01)
*H04N 5/247* (2006.01)
*G02B 5/18* (2006.01)

(52) U.S. Cl.
CPC ........... *G06F 3/016* (2013.01); *G02B 5/1842* (2013.01); *G02B 5/1871* (2013.01); *G06F 1/163* (2013.01); *G06F 3/017* (2013.01); *G06F 3/0421* (2013.01); *G06F 3/0428* (2013.01); *H04N 5/247* (2013.01)

(58) Field of Classification Search
CPC ........ G06F 3/016; G06F 3/0428; G06F 1/163; G06F 3/017; G06F 3/0421; G06F 3/042; G06F 3/0425; G06F 3/0426; G02B 5/1871; G02B 5/1842; H04N 5/247
See application file for complete search history.

(56) References Cited

U.S. PATENT DOCUMENTS

| 3,775,560 A | 11/1973 | Ebeling |
| 5,454,043 A | 9/1995 | Freeman |
| 6,128,003 A | 10/2000 | Smith et al. |
| 7,340,077 B2 | 3/2008 | Gokturk et al. |
| (Continued) | | |

FOREIGN PATENT DOCUMENTS

EP 2624116 A1 7/2013

OTHER PUBLICATIONS

Garcia-Martinez et al., "Generation of Bessel beam arrays through Dammann gratings," vol. 51, No. 9 / Applied Optics, Mar. 20, 2012.
(Continued)

*Primary Examiner* — Ibrahim A Khan
(74) *Attorney, Agent, or Firm* — Silicon Edge Law Group LLP; Arthur J. Behiel

(57) ABSTRACT

A user interface includes both a touchscreen for tactile input and one or more lensless optical sensors for sensing additional, remote gestures. Users can interact with the user interface in a volume of space near the display, and are thus not constrained to the relatively small area of the touchscreen. Remote hand or face gestures can be used to turn on or otherwise alter the tactile user interface. Shared user interfaces can operate without touch, and thus avoid cross-contamination of e.g. viruses and bacteria.

11 Claims, 13 Drawing Sheets

(56) References Cited

U.S. PATENT DOCUMENTS

| | | |
|---|---|---|
| 7,834,847 B2 | 11/2010 | Boillot et al. |
| 8,354,997 B2 | 1/2013 | Boillot |
| 8,373,654 B2 | 2/2013 | Wang et al. |
| 8,433,138 B2 | 4/2013 | Wang |
| 8,451,248 B1 | 5/2013 | Kim |
| 8,624,836 B1 | 1/2014 | Miller et al. |
| 8,768,006 B2 | 7/2014 | Subramanian et al. |
| 8,928,604 B2 | 1/2015 | Wong et al. |
| 8,947,305 B2 | 2/2015 | Amm et al. |
| 8,972,902 B2 | 3/2015 | Nishihara et al. |
| 9,071,336 B2 | 6/2015 | Schlub et al. |
| 9,071,366 B2 | 6/2015 | Schlub et al. |
| 9,086,318 B1* | 7/2015 | Baldwin ............ G01J 1/04 |
| 9,088,282 B2 | 7/2015 | Holenarsipur et al. |
| 9,098,124 B2 | 8/2015 | Holenarsipur |
| 2003/0044729 A1* | 3/2003 | Huang ............ G02B 5/1814 |
| | | 430/321 |
| 2003/0132913 A1 | 7/2003 | Issinski |
| 2007/0130547 A1 | 6/2007 | Boillot |
| 2007/0214462 A1 | 9/2007 | Boillot |
| 2010/0026723 A1 | 2/2010 | Nishihara et al. |
| 2010/0150399 A1 | 6/2010 | Svajda et al. |
| 2010/0221668 A1 | 9/2010 | Makino et al. |
| 2011/0204209 A1* | 8/2011 | Barrows ............ G02B 27/58 |
| | | 250/208.1 |
| 2011/0221668 A1 | 9/2011 | Haddick et al. |
| 2012/0001875 A1 | 1/2012 | Li et al. |
| 2012/0280900 A1 | 11/2012 | Wang et al. |
| 2013/0215235 A1* | 8/2013 | Russell ............ H04N 13/0203 |
| | | 348/47 |
| 2014/0189569 A1* | 7/2014 | Eleftheriou ........ G06F 3/0233 |
| | | 715/773 |
| 2015/0023607 A1 | 1/2015 | Babin et al. |
| 2015/0061994 A1 | 3/2015 | Dai et al. |
| 2016/0209929 A1* | 7/2016 | Trisnadi ............ G06F 3/0304 |

OTHER PUBLICATIONS

N. Guerineau et al., "Generation of achromatic and propagation-invariant spot arrays by use of continuously self-imaging gratings," vol. 26, No. 7 / Optics Letters, Apr. 1, 2001.

* cited by examiner

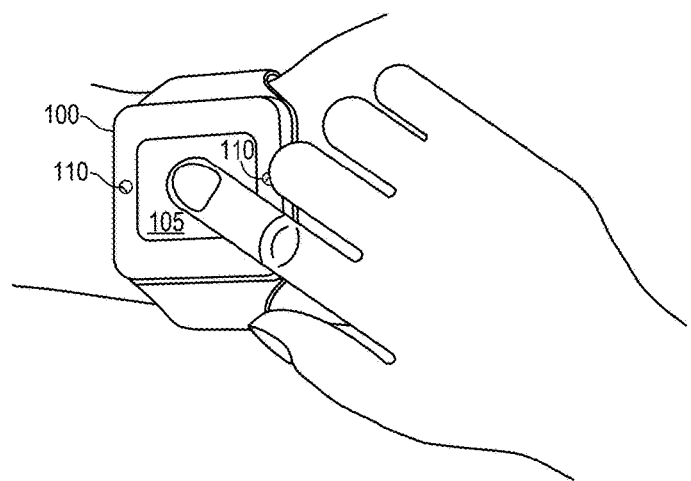
FIG. 1A
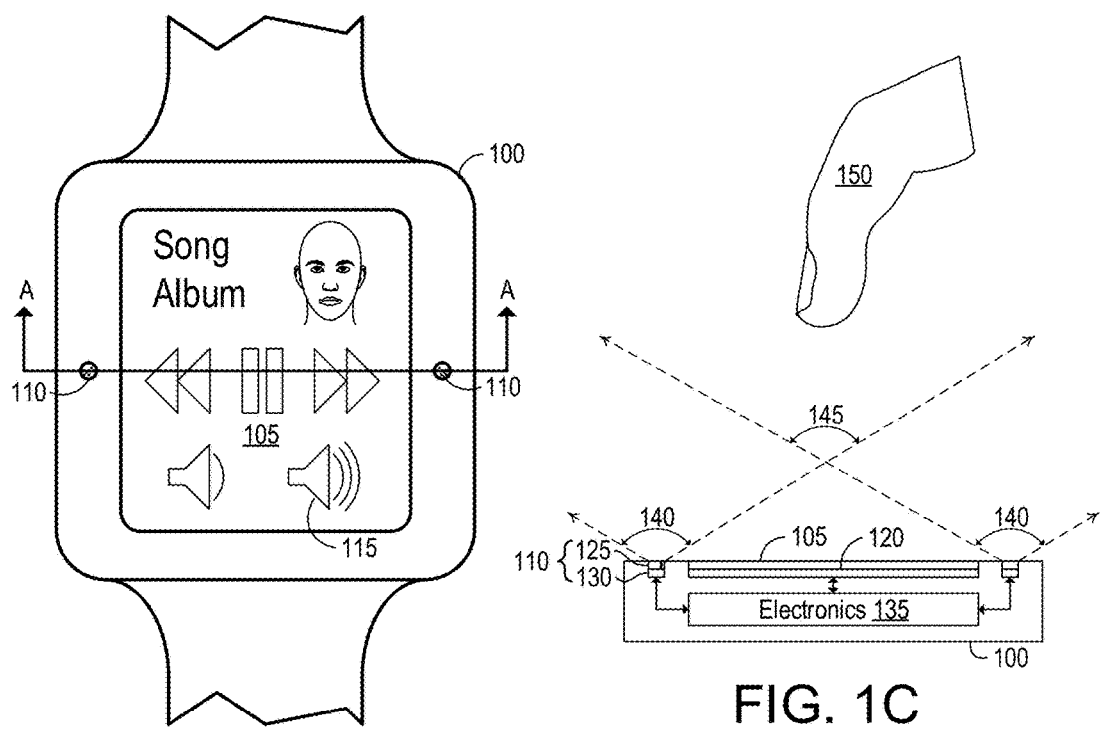
FIG. 1B
FIG. 1C

US 10,261,584 B2

TOUCHLESS USER INTERFACE FOR HANDHELD AND WEARABLE COMPUTERS

BACKGROUND

Handheld and wearable computers commonly include displays equipped with touchscreens. Unfortunately, such computers are of necessity compact and lightweight, and their displays consequently small relative to the size of users' hands and fingers. Interacting with such displays can therefore be cumbersome.

BRIEF DESCRIPTION OF THE DRAWINGS

FIG. 1A depicts a wearable computer 100 (a "smart watch") with a user interface that includes both a touchscreen 105 for tactile input and a pair of lensless, diffractive imaging devices 110 for sensing more remote gestures.

FIG. 1B is a plan view of wearable computer 100 with the user interface displaying text, an image, and icons 115 for controlling a music player.

FIG. 1C is a cross-sectional view of wearable computer 100 taken along the line A-A of FIG. 1B.

DETAILED DESCRIPTION

Figure 2A:
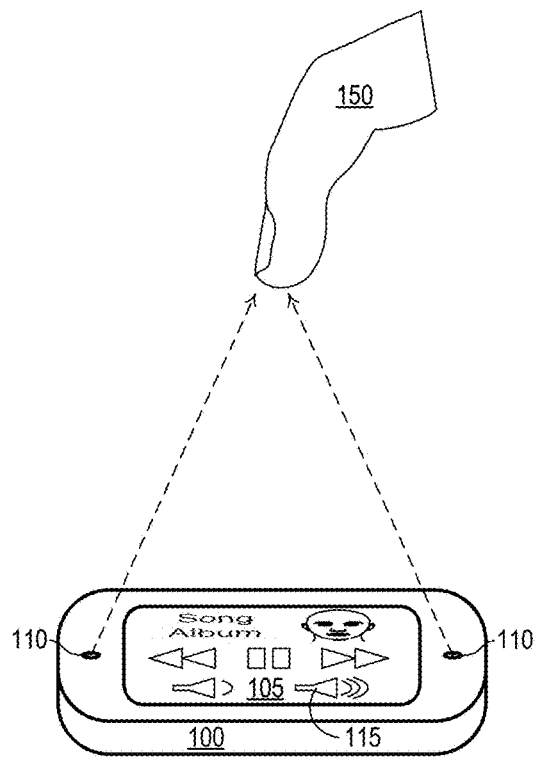
FIG. 2A is a side view of computer 100 of FIGS. 1A-1C, absent the watch band, with finger 150 within sight of the two diffractive sensors 110.

FIG. 1A depicts a wearable computer 100 (a "smart watch") with a user interface that includes both a touchscreen 105 for tactile input and a pair of lensless, diffractive imaging devices 110 for sensing remote gestures. Users can interact with computer 100 in the volume of space above the display, and are thus not constrained to the relatively small area of touchscreen 105. Remote hand or facial gestures can be used to activate the display or otherwise alter information presented to the user.

Being lensless, diffractive imaging devices 110 are small and inexpensive relative to optical cameras. Specific examples are detailed below. Briefly, each imaging device 110 includes an optical grating that splits and diffracts incident light into foci that form patterns on an underlying image sensor. These patterns are largely unintelligible to a human observer, but can be used to distinguish gestures and locate objects—such as a fingertip—within the field of view.

FIG. 1B is a plan view of wearable computer 100 with the user interface displaying text, an image, and icons 115 for controlling a music player. FIG. 1C is a cross-sectional view of wearable computer 100 taken along the line A-A of FIG. 1B. Touchscreen 105 is transparent, and overlies an electronic display 120 (e.g., an LCD or OLED display). Optical grating 125 forms patterns of light on an image sensor 130 in, for example, the manner detailed below in connection with FIGS. 10A and 10B. Image sensor 130, a two-dimensional array of photosensitive elements in this example, converts the patterns into electrical signals for delivery to and processing by electronics 135. As detailed below, electronics 135 includes one or more processors and memory for sensing and recognizing tactile gestures via touchscreen 105 and remote gestures via diffractive sensors 110, and for rendering images for communication via display 120.

Each imaging device 110 has a relatively wide field of view 140, approximately 120° in this example, allowing computer 100 to detect and interpret finger or hand gestures just a few centimeters above touchscreen 105. Though not shown, lenses or prisms can be used to narrow, widen, tilt, or otherwise change these fields of view. In other embodiments gratings 125 can be formed on or within lenses or prisms.

An intersection 145 of both fields of view 140 allows for binocular vision, and concomitant improved depth perception. The user interface of computer 100 thus effectively includes a volume of space above touchscreen 105, a space far larger than computer 100. In this example, sensors 110 provide electronics 135 disparate patterns of the same scene, allowing electronics 135 to compute the position of a finger 150 in three-dimensional space, and changes in that position over time. Computer 100 is thus able to supplement the tactile user input received via touchscreen 105 with gestural user input received via sensors 110.

Computer 100 can include a light source, such as one or more infrared LEDs, to aid imaging devices 110. More or fewer optical sensors 110 can be included on the face or other surfaces of computer 100, and sensors 110 can be arranged in one or more sensor arrays. Filters can be provided to selectively admit the light from that source to reduce ambient interference. Imaging devices 110 can also be timed to any flicker of display 120 to take advantage of the illumination therefrom, or to reduce or eliminate the impact of said illumination.

FIG. 2A is a side view of computer 100 of FIGS. 1A-1C, absent the watch band, with finger 150 within sight of the two diffractive sensors 110. Of the icons 115, this example considers the "increase-volume" symbol at the lower right, and describes the operation of the user interface when a user is interested in selecting that symbol. FIG. 2B, a plan view of computer 100 with the same displayed information, is included for clarity.

Figure 2C:
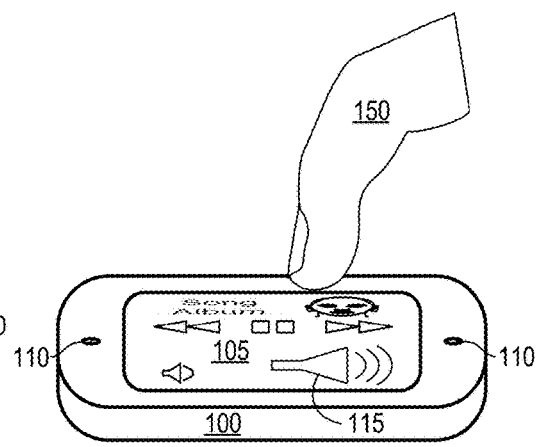
FIG. 2C is a second side view of computer 100, much the same as FIG. 2A.
Figure 2B:
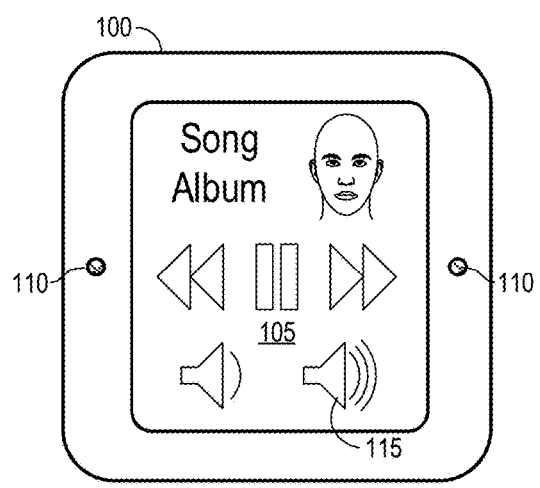
FIG. 2B, a plan view of computer 100 with the same displayed information, is included for clarity.

FIG. 2C is a second side view of computer 100, much the same as FIG. 2A. This view differs, however, in that computer 100 has altered the displayed information responsive to the approach of finger 150. Images sensors 110 sensed the proximity and X-Y position of finger 150, and computer 100 responded by enlarging the increase-volume button and shrinking the remaining icons. This alteration of the displayed information provides the user with visual feedback for the selection she is about to make, and she can move finger 150 laterally above the display to adjust her selection based on this feedback. For example, she might move her finger to the left had she intended to reduce the volume, in which case computer 100 would responsively shrink the increase-volume icon and expand the reduce-volume icon.

Figure 2D:
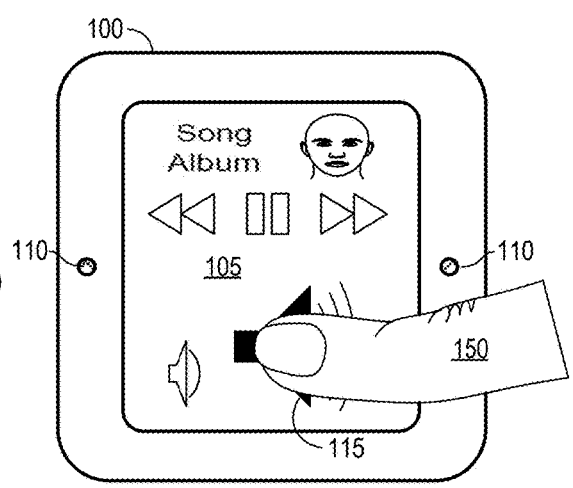
FIG. 2D is a plan view of computer 100 displaying information similar to what is shown in FIG. 2C.

FIG. 2D is a plan view of computer 100 displaying information similar to what is shown in FIG. 2C. In this example, finger 150 has made contact with touchscreen 105 in the region of the increase-volume icon. Touchscreen 105 senses this selection, and computer 100 highlighted the icon to provide the user positive feedback indicative of her selection. Computer 100 could additionally or instead provide audible or haptic feedback.

Figure 3A:
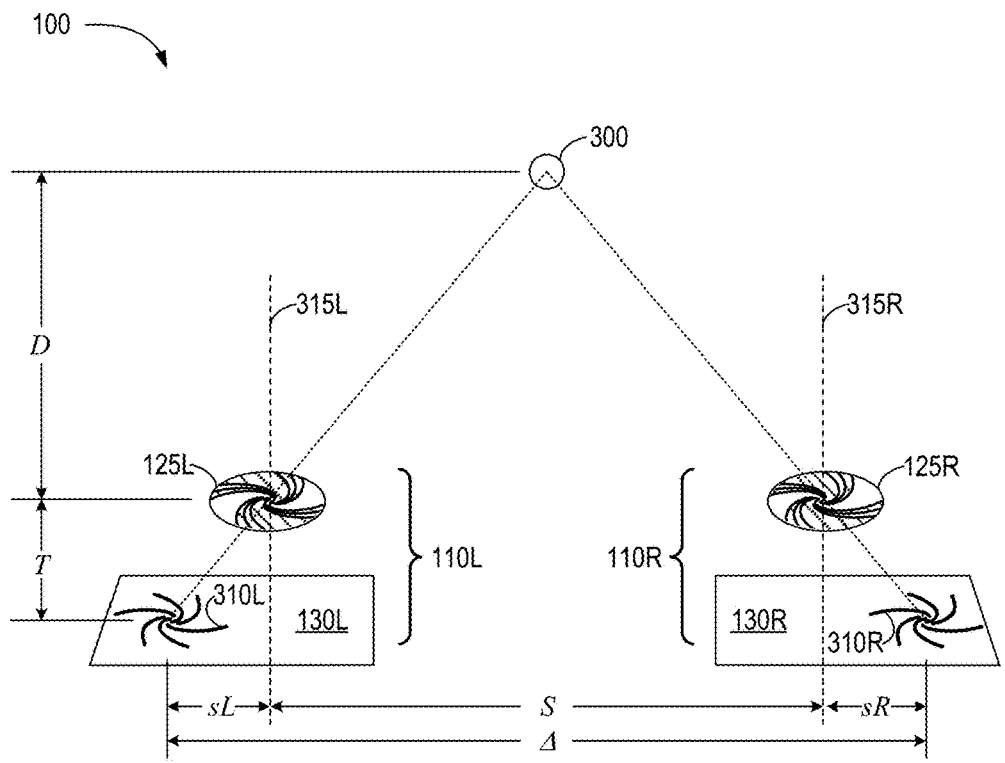
FIG. 3A illustrates how computer 100 of FIGS. 1A-1C uses a pair of diffractive imaging devices 110L and 110R for binocular depth-perception.

FIG. 3A illustrates how computer 100 of FIGS. 1A-1C uses a pair of diffractive imaging devices 110L and 110R for binocular depth-perception. Imaging devices 110L and 110R can be manufactured to tight tolerances using well characterized and readily available integrated-circuit (IC) fabrication techniques, and can thus be made small, cost-effective, and efficient relative to focusing systems of comparable performance.

Imaging devices 110L and 110R are physically separated in this example, which provides superior depth resolution. Multiple imaging devices can be instantiated on the same IC in other embodiments. In that case, the planar alignment and controlled spacing intrinsic to IC fabrication simplify calibration and ensure repeatable imaging-device spacing among ICs.

Gratings 125L/R occupy light-transmissive regions in otherwise opaque layers, and are separated from underlying arrays 130L/R by a thickness T and from one another by an inter-pupil spacing S. Thickness T and spacing S are constants that can be known with considerable precision, either due to manufacturing tolerances or by calibration. For illustrative purposes, an object 300 is shown separated from the plane shared by imaging devices 110L/R by a depth D. Object 300 approximates a point source, and represents any object of interest in a scene (e.g., the tip of a finger). Depth D is of interest in this example, but each of sensors 110L/R can also locate object 300 in the other two (X and Y) dimensions.

Light from object 300 enters each grating 125L/R to produce respective left and right interference patterns 310L/R for capture by arrays 130L/R. Patterns 310L/R include near-field spatial modulations that cover ranges of spatial frequencies and orientations sufficient to locate the direction of object 300 at a desired resolution. Arrays 130L/R can be synchronized to minimize motion artifacts, and the pixel array orientation can be at some angle (such as 22.5 degrees) relative to the orientation of the inter-pupil spacing S to minimize measurement artifacts.

Light from object 300 enters each grating at a different angle of incidence due to spacing S, and those angles shift patterns 310L/R by respective shifts sL and sR with respect to left and right optical axes 315L/R, which may serve as references. Depth D is easily calculated using the measured shifts sL and sR and constant spacing S and thickness T. To a first approximation, when object 300 is close to the optical axis of the system, depth D is the product of constants S and T divided by the sum of shifts sL and sR times the refractive index n of the medium separating gratings 125L/R from arrays 130L/R. In equation form:

$$D = ST/n(sL+sR) \qquad (1)$$

Alternatively, the sum of shifts sL and sR can be replaced with the separation Δ between patterns 310L/R less inter-pupil spacing S, giving:

$$D = ST/n(\Delta-S) \qquad (2)$$

In this case, each of patterns 310L/R effectively serves as a reference for the other. More accurate measures can be made using e.g. Snell's law to account for the angle dependence of refraction through the layers of each imaging device 110L/R.

Figure 3B:
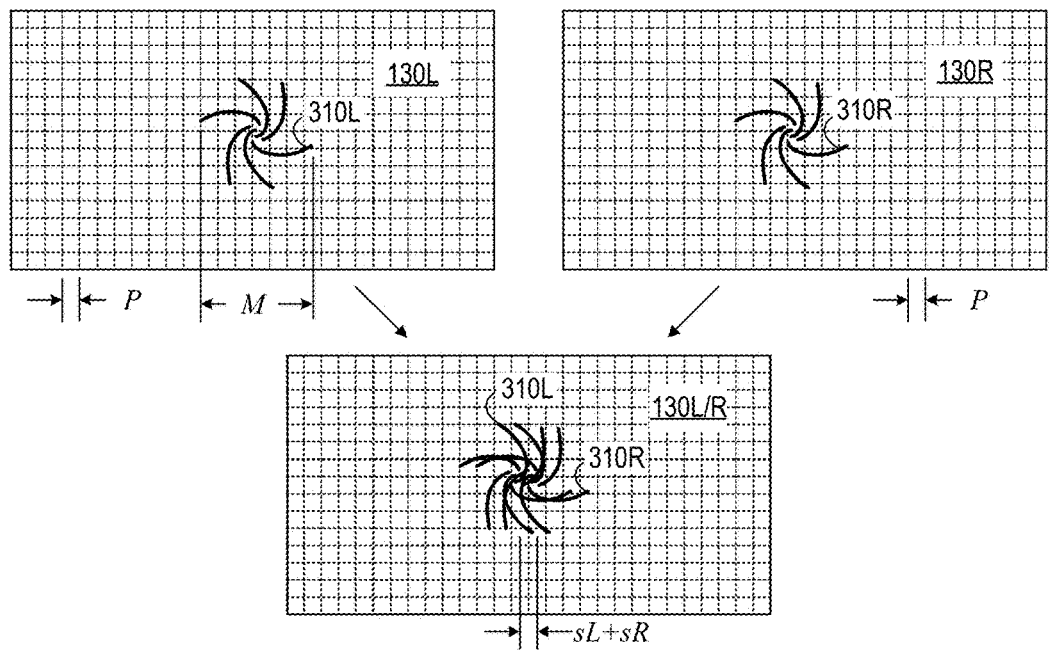
FIG. 3B is a plan view of arrays 130L/R with respective diffraction patterns 310L/R overlaid to show their relative displacement and the sum sL+sR.

FIG. 3B is a plan view of arrays 130L/R with respective diffraction patterns 310L/R overlaid to show their relative displacement and the sum sL+sR. Arrays 130L/R are identical in this embodiment, each with a pixel pitch P along the horizontal and vertical dimensions. (Pixels need not be square, in which case pitch P refers to the maximum pixel spacing.) Patterns 310L/R are considerably larger than pitch P, having a maximum response dimension M at least six times the pitch (M>6P). Small shifts impact a large number of pixels, and thus enable sub-pixel measurement precision.

Image sensors 130L/R can be e.g. CMOS image sensors, in which case each pixel includes a photodetector that generates and stores charge responsive to light. Each pixel or small group of pixels additionally includes isolation boundaries and segments of conductors that extend between the rows and columns of photodetectors to communicate control signals and the illumination to circuitry outside the array. Viewed as a whole, a CMOS image sensor thus appears as a two-dimensional mosaic of photosensitive areas bounded by less sensitive or insensitive regions. Small shifts between adjacent pixels can therefore introduce measured intensity changes that are due to variations in pixel sensitivity rather than incident angle. CMOS processes give very precise lateral dimensions, so attributes of pixel geometry are very well specified for a given device. Pixels are thus regularly spaced by a known pitch and the pixel sub-elements are of regular and known shapes and sizes. The regular variations in pixel sensitivity thus combine across the array to produce noise that is band-limited to a known set of spatial-frequencies. Relatively large point-source responses of the type detailed herein make it easier to distinguish the signal of interest—the patterns—from this spatial noise.

Figure 4:
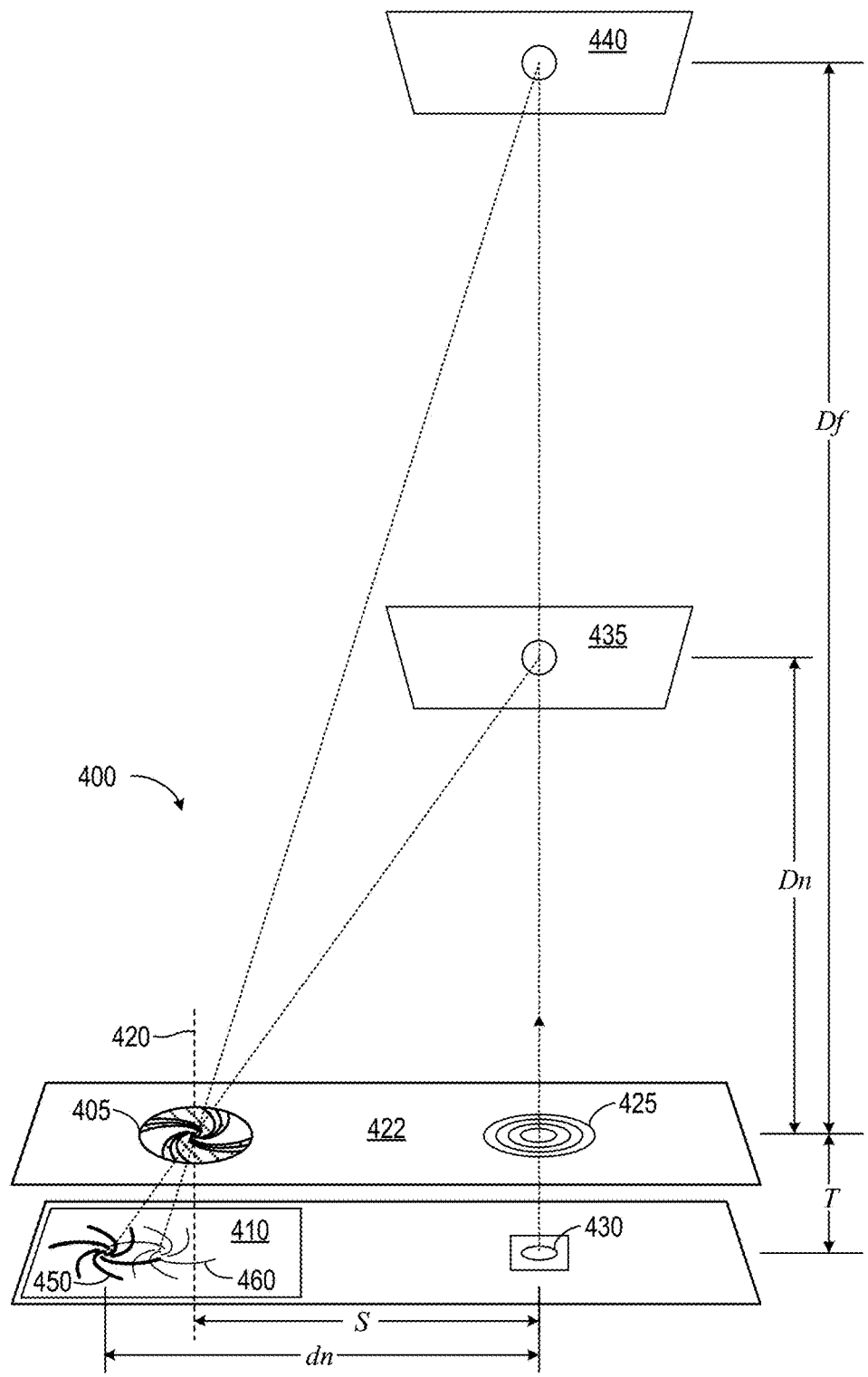
FIG. 4 depicts a depth-perception system 400 that can be incorporated into computer 100 of FIGS. 1A-1C in lieu of a binocular system.

FIG. 4 depicts a depth-perception system 400 that can be incorporated into computer 100 of FIGS. 1A-1C in lieu of a binocular system. System 400 includes but one imaging grating 405 instead of the pair used in computer 100 of FIGS. 1A-1C. An array 410 of photosensitive pixels captures diffraction patterns in the manner detailed previously to measure an offset of an interference pattern 450 relative to an optical axis 420. Grating 405 is formed in an opaque layer 422 that also includes an optical element—a Fresnel zone plate 425—to columnate a beam transmitted from a light source 430. Zone plate 425 is positioned directly over light source 430 so that a beam projects upward, normal to layer 422. Including zone plate 425 improves manufacturing tolerance because lateral shifts of patterned layer 422 affect both the direction of the laser beam and optical axis 420 in a way that tends to cancel the impact of the shift on distance measurements. The beam reflects off remote objects, a near object 435 and a far object 440 in this example.

Reflected light from object 435 enters grating 405 to produce an interference pattern 450 for capture by array 410. The axis of light source 430 serves as a reference location. The center of pattern 450 is spaced from this reference by a distance do that can be used to calculate depth Dn to object 435. In particular, depth Dn can be computed using the following equation:

$$Dn=ST/(n(dn-S)) \quad (3)$$

where T is the separation between grating 405 and sensor array 410, n is the index of refraction between grating 405 and sensor array 410, and S is the spread between optical axis 420 and light source 430. The depth Df to a more distant object 440 can similarly be computed using its corresponding interference pattern 460.

The light source and related focusing element are integrated with grating 405 and array 410 in this embodiment, but can be located elsewhere. Further, a light source can be similarly integrated into computer 100 of FIG. 1A-1C. A color filter matched to the illumination can allow the imaging system to reject much of the scene background, so that the sharp point source from the light source and optics can be readily distinguished from most diffuse light sources. In some embodiments the illumination is polarized and the sensor equipped with a cross polarized filter, eliminating specular reflections of the light source, which optically appear to come from a different depth than the reflecting object.

Figure 5A:
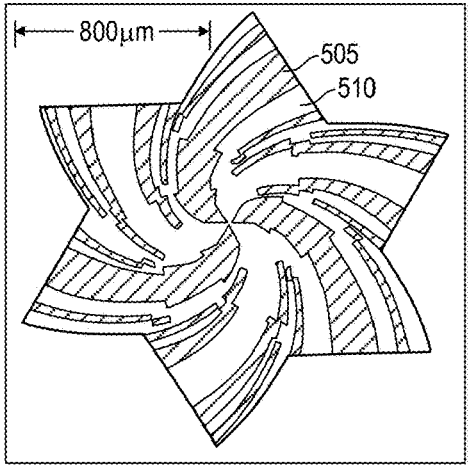
FIG. 5A is a plan view of a grating 500 that can be used for e.g. gratings 125 of FIG. 1C.

FIG. 5A is a plan view of a grating 500 that can be used for e.g. gratings 125 of FIG. 1C. Gratings of this type are detailed below in connection with later figures. Briefly, grating 500 includes spiral features 505 and 510 that together produce two-dimensional diffraction patterns. Relatively narrow (wide) segment spacing works better for relatively high (low) frequencies of light, feature spacing increases along odd-symmetry boundaries (between elevated and recessed grating regions, represented by dark and light) with distance from the center of the spiral. Curved boundaries of odd symmetry, defined between the elevated and recessed regions, extend radially from the center of the grating to the periphery, radiating out between the dark (elevated) and light (recessed) arms near the center. In some embodiments, the functional form of the curved boundaries approximates a logarithmic spiral. Other suitable gratings and imaging devices are described in U.S. Pat. No. 9,110,240 to Patrick R. Gill and David G. Stork, which issued 18 Aug. 2015 and is incorporated herein by reference.

Figure 5B:
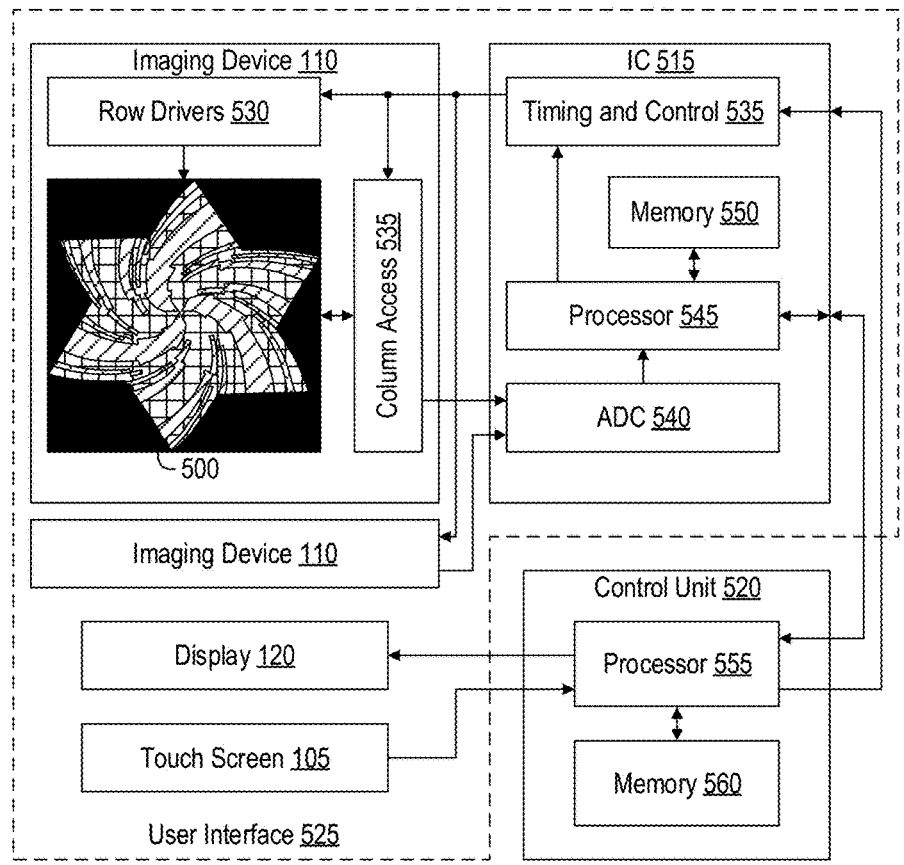
FIG. 5B schematically depicts wearable computer 100 of FIGS. 1A-1C.

FIG. 5B schematically depicts wearable computer 100 of FIGS. 1A-1C. As noted previously, computer 100 includes a touchscreen 105, two imaging devices 110, and a display 120. Computer 100 additionally includes a monolithic integrated-circuit device (IC) 515 for controlling and extracting image data from sensors 110, and a central control unit 520 for managing touchscreen 104, display 120, and IC 515. In this example, touchscreen 105, images sensors 110, display 120, and IC 515 are collectively the user interface 525 of computer 100; and IC 515 and control unit 520 are components of electronics 135 of FIG. 1C in this example. IC 515 can be integrated with one of imaging devices 110, or the functionality provided by IC 515 can be divided between them in other embodiments.

Each imaging device 110 includes display 120 (pixels of which are visible below features 505) underlying grating 500, row drivers 530, and column access circuitry 535. IC 515 includes timing and control circuitry 535, which controls row drivers 530 and column access circuitry 535 to direct the pixel array to convey analog image data to an analog-to-digital converter (ADC) 540. A processor 545 with access to integrated memory 550 processes the digital data from ADC 540 to produce image data for conveyance to control unit 520. The image data can represent the raw intensities captured by imaging devices 110, or processor 545 can process the image data to provide more information about the imaged scene. For example, processor 545 might issue signals indicative of image features or gestures.

Control unit 520 includes a processor 555 and memory 560 to control and interact with user interface 525. Processor 555 receives data from touchscreen 105 and IC 515 to determine a position of a user input device, such as a stylus or finger, and to interpret tactile and remote gestures. Processor 555 may include a dedicated graphical processor or controller to control and manipulate the content provided to the user on display 120.

Imaging devices 110 can include or be used with a focusing element (e.g., a lens), but they do not require a focusing element to produce images. Rather than focusing, as would be done by a traditional camera, each imaging device 110 captures a diffraction pattern that bears little resemblance to an imaged scene, but that is nevertheless interpretable by IC 515. IC 515 and control unit 520 can be standalone ICs or part of a system on a chip (SoC) that may support smartwatch functions other than those that relate to user interface 525.

Grating 500 creates a certain point-spread function (PSF), a multi-armed spiral in this example, on the underlying array for every point of light in the imaged scene. The location of the center of the PSF is uniquely determined by the incident angle of light from the point source. Since faraway scenes can be thought of as collections of point sources of varying intensity, the sensed signals resemble a convolution of the PSF with the faraway scene. A scene can be computationally reconstructed from its corresponding interference pattern, but gesture recognition and depth perception may not require such image reconstruction.

Figure 6A:
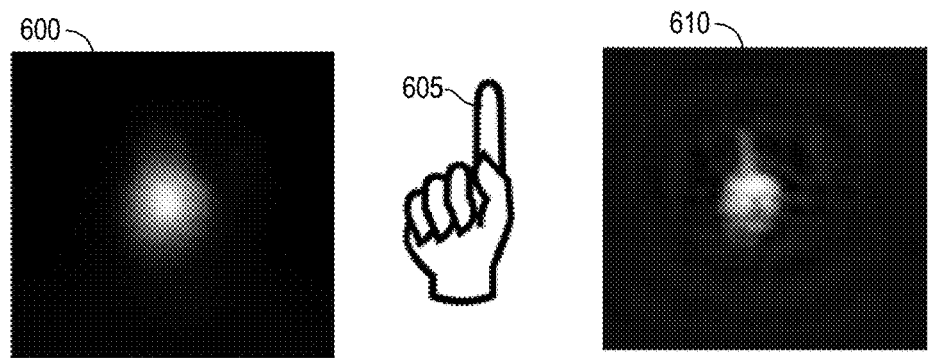
FIG. 6A depicts an interference pattern 600 captured using an imaging device with a grating similar to grating 500 of FIG. 5A.
Figure 6B:
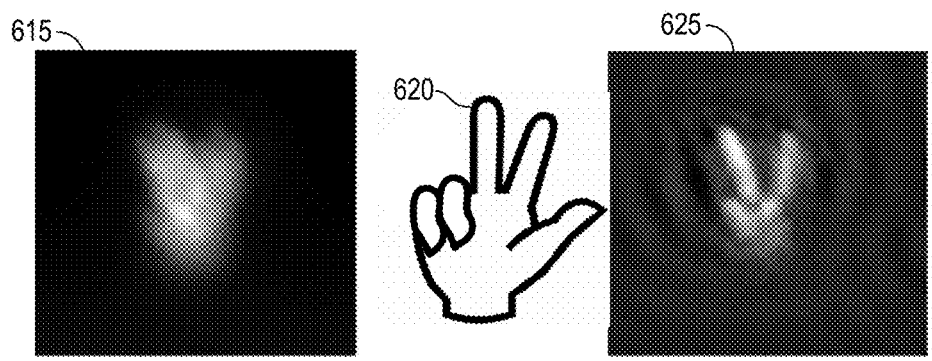
FIG. 6B depicts an interference pattern 615 captured of a human hand with two fingers extended, represented as icon 620, and a Fourier-based reconstruction 625 of the imaged scene, from which one can make out the hand with two fingers.
Figure 6C:
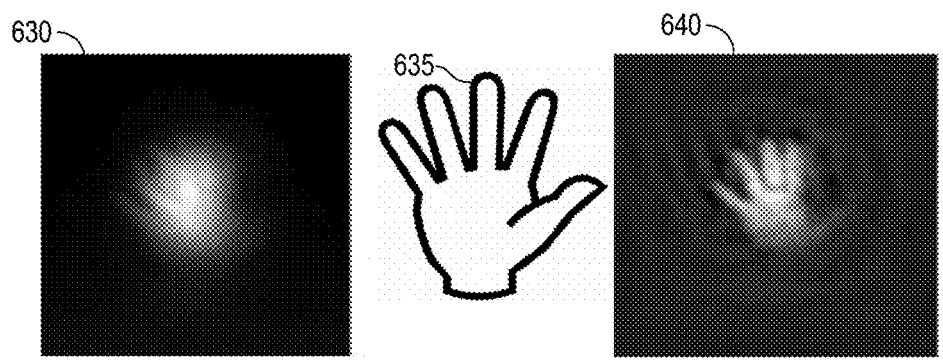
FIG. 6C depicts an interference pattern 630 captured of a human hand with all five digits extended, represented as icon 635, and a Fourier-based reconstruction 640 of the imaged scene.

FIG. 6A depicts an interference pattern 600 captured using an imaging device with a grating similar to grating 500 of FIG. 5A. Though this raw sensor reading bears little resemblance to a human hand, the imaged object was a human hand with one finger extended, represented as icon 605. FIG. 6A also includes a Fourier-based reconstruction 610 of the imaged scene, from which one can make out the hand with finger. FIG. 6B depicts an interference pattern 615 captured of a human hand with two fingers extended, represented as icon 620, and a Fourier-based reconstruction 625 of the imaged scene, from which one can make out the hand with two fingers. FIG. 6C depicts an interference pattern 630 captured of a human hand with all five digits extended, represented as icon 635, and a Fourier-based reconstruction 640 of the imaged scene. Reconstructions 610, 625, and 640 are included to show that respective interference patterns 600, 615, and 630 include sufficient information for computer 100 to distinguish them, and thus the corresponding gestures. The patterns do not require such reconstruction for this purpose. Rather, one or more processors within computer 100 extracts features from the raw data and compares those features with a set of locally stored "classifiers" to find a match.

A classifier database can be obtained by collecting exemplars of image patterns for candidate gestures, along with a "no hand" gesture category. Image patterns might also be collected for facial detection or recognition. These data and subsequent imaging can use visible light, infrared light, or both. Additional training data is then "manufactured" within expected or desired ranges and distributions, for example to account for gesture variations due to rotation, scale, pixel noise, or light levels.

Image features (raw pixels, feature points such as tips of fingers, normalized area of hand, etc.) are extracted from the patterns of training data, and a classifier is trained using the extracted features. Suitable machine-learning classifiers for this purpose include Naïve Bayes classifiers and k-Nearest Neighbors (k-NN) classifiers. Such training can be accomplished in situ with hand or face gestures. Computer 100 can additionally classify new patterns, such as to customize the user interface for a given user or application. For example, a security feature might employ face recognition to verify the presence of the owner of computer 100 before allowing access to certain applications or data.

Time-dependent classifiers can be derived using e.g. a hidden Markov model (HMM) for recognition of short dynamic gestures, such as waving, sweeping, or approaching (touching or nearly touching). Methods and systems for measuring optical flow that can be used to classify and recognize dynamic gestures are detailed in International Publication WO 2015/127043 to Patrick R. Gill, David G. Stork, and Patrick Johnstone, entitled "Optical Flow Sensing and Pattern Recognition with Antisymmetric Phase Gratings," which published 27 Aug. 2015 and is incorporated herein by reference. Some embodiments triangulate the closest part of an imaged scene (e.g., the tip of a finger) without performing a full reconstruction. Such processing is relatively simple, and is effective for e.g. "touchless" touchscreen applications.

Once the classifiers are known, a classifier database is loaded into a local memory in computer 100. In the example of FIG. 5B, processor 545 references a classifier database in e.g., memory 550 to classify image data from imaging devices 110, and passes data indicative of gestures to processor 555. Processor 555 can control aspects of computer 100 based on these gestures, such as to activate or otherwise alter the information provided via display 120.

Figure 7A:
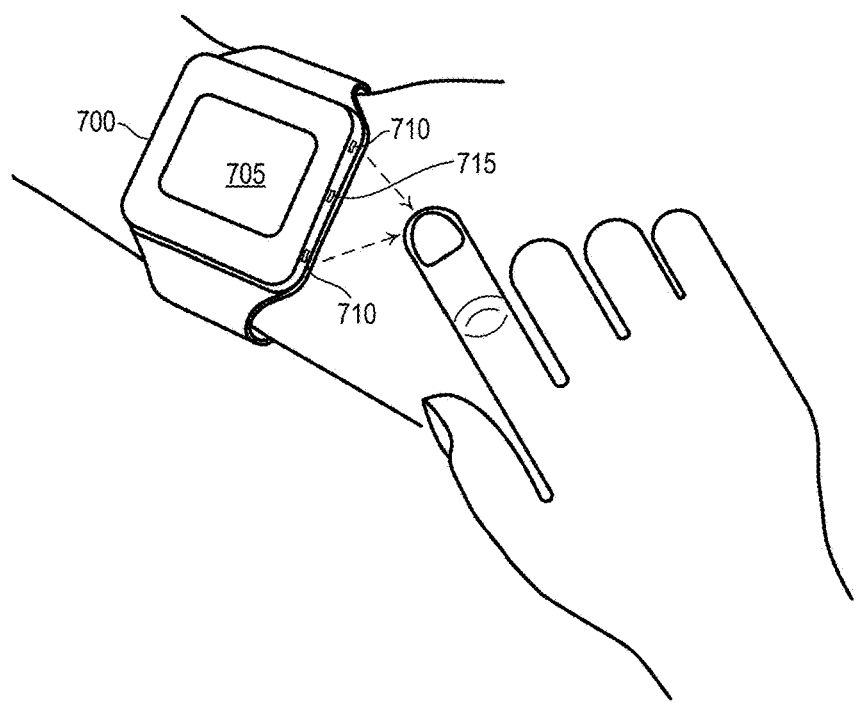
FIG. 7A depicts a wearable computer 700 with a user interface that includes a touchscreen 705 for tactile input, a pair of lensless optical sensors 710 for sensing more remote gestures to the side of computer 700, and an infrared LED for sensing the approach of an input device (e.g. a finger) and illuminating gestures.

FIG. 7A depicts a wearable computer 700 with a user interface that includes a touchscreen 705 for tactile input, a pair of lensless optical sensors 710 for sensing more remote gestures to the side of computer 700, and an infrared LED for sensing the approach of an input device (e.g. a finger) and illuminating gestures. Users can interact with computer 700 in the volume of space beside the display, such as by "writing" on the adjacent wrist or forearm, and are thus not constrained to the relatively small area of touchscreen 705. More or fewer optical sensors 710 can be included on other surfaces of computer 700. Lens-based cameras can also be included in this or other embodiments work together with or separately from sensors 710. For example, sensors 710 can be used to awaken or otherwise control an integrated camera. Or, if computer 700 is coupled to a remote camera or smartphone via e.g. a Bluetooth connection, then computer 700 can be used to provide gestural control of the remote device.

Figure 7B:
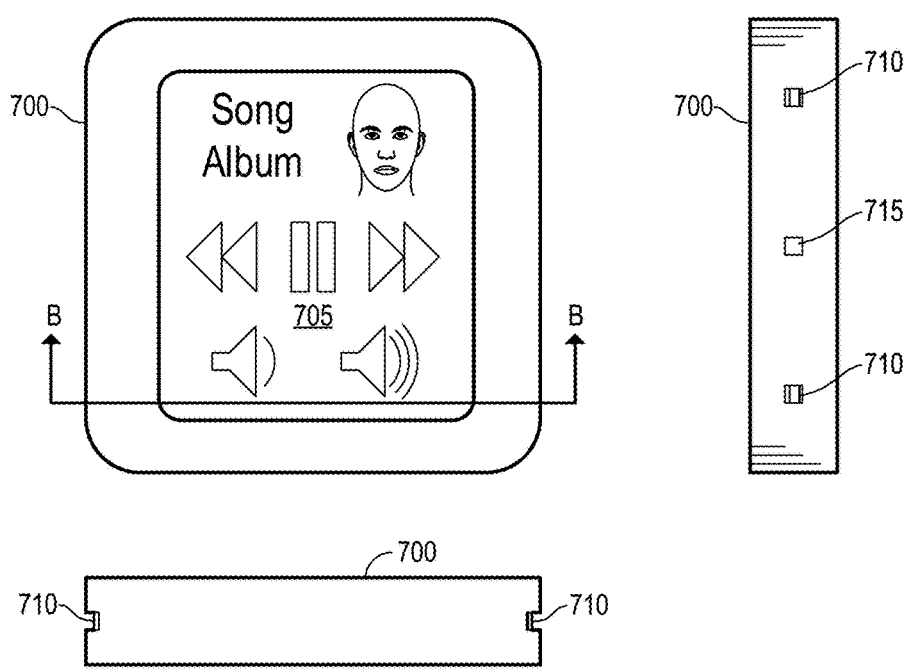
FIG. 7B includes plan, side, and lower-edge views of wearable computer 700 of FIG. 7A with the user interface displaying text, an image, and icons for controlling a music player.

FIG. 7B includes plan, side, and lower-edge views of wearable computer 700 with the user interface displaying text, an image, and icons for controlling a music player. The lower-edge view is cross-sectional, taken along the line B-B of the plan view, to show diffractive sensors 710 can be on both sides, and can be recessed in the body of computer 700 to limit ambient light from e.g. the sun to improve the signal-to-noise ratio for sensed images.

Figure 8A:
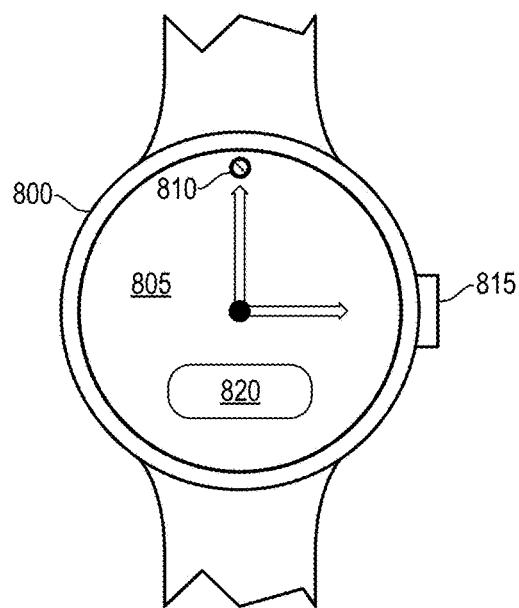
FIG. 8A depicts a watch 800 with a mechanical or simulated analog face 805 that incorporates a diffractive image sensor 810.

FIG. 8A depicts a watch 800 with a mechanical or simulated analog face 805 that incorporates a diffractive image sensor 810 of the type detailed previously. A crown 815 can be pressed or turned to e.g. activate sensor 810, and a digital display 820 provides user feedback. Image sensor 810 is show larger than is required. In FIG. 5A, for example, grating 500 occupies a square area approximately 2 mm on a side, and functional gratings can be made smaller still. Diffractive image sensors can thus be unobtrusively integrated into analog or digital displays. A complex user interface can thus be realized without unduly interfering with the beauty and apparent simplicity of the design.

Watch 800 can use information from image sensor 810 in conjunction with the outputs from other integrated sensors to perform interesting functions. For example, if fitted with an accelerometer to detect the direction of gravitational force and a magnetometer for direction, this information can be combined with a measure of the sun's position—determined using image sensor 810—and the time of day to find the approximate location of watch 800 on the Earth's surface.

Figure 8B:
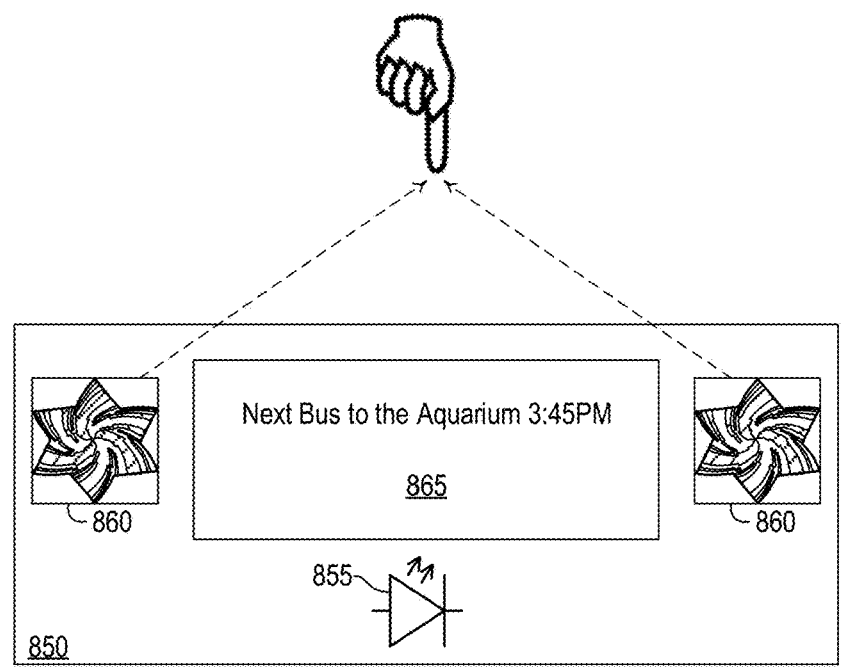
FIG. 8B depicts a touchless, interactive display 850 that supports remote gesture recognition.

FIG. 8B depicts a touchless, interactive display 850 that supports remote gesture recognition. Display 850 includes an IR LED 855, a pair of lensless image sensors 860, and a display area 865 (e.g., an LCD). While not shown, display 850 additionally includes the requisite electronics to process image data and control LCD 865. Such displays can be used e.g. in public places to avoid the spread of disease, and for control of interfaces for e.g. cookbooks, maintenance manuals, operating room tablets, etc., that benefit from touchless interfaces.

Figure 9A:
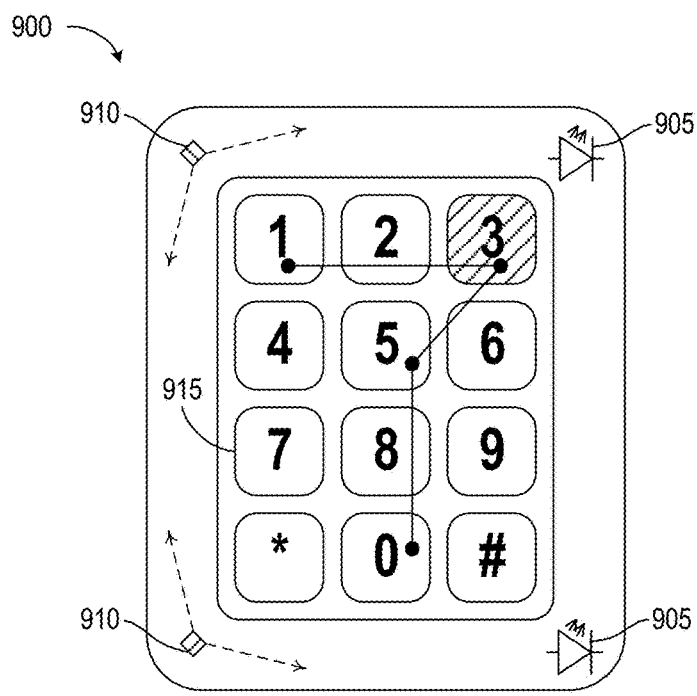
FIG. 9A depicts a touchless keypad 900 in accordance with another embodiment.

FIG. 9A depicts a touchless keypad 900 in accordance with another embodiment. Users can interact with keypad 900 e.g. to enter keys for unlocking doors and storage containers. Touchpads with similar arrangements of keys are commonly used in hospitals to secure drugs and equipment. Unfortunately, serious diseases can be spread by hospital personal sharing access to such surfaces. For example, a study presented at the American Thoracic Society's annual conference in 2014 concluded that the bacterial infection sepsis contributes to as many as half of all hospital deaths in the United States. Keypad 900 limits personnel exposure to shared surfaces, and thus the probability the spread of bacterial and viral infections. Of course, shared keypads and touch screens in other contexts can also spread infections, so keypad 900 has beneficial uses outside the hospital context.

Each imaging device 910 is oriented to receive light passing substantially parallel to the plane of keypad 900. That light can be ambient, but in this instance keypad 900 includes a pair of IR LEDs 905, a pair of lensless image sensors 910, and a display, such as an LCD, that includes or depicts keys 915. LEDs 905 can be omitted in application with sufficient ambient light. Image sensors 910 sense the movement of a user's fingertip above keys 915, illuminating the area of each key if the finger settles in the vicinity above the key for a specified interval. The user enters a code, 1-3-5-0 in this example, by waving her finger over the keys along the illustrated path. Electronics can be integrated with keypad 900, or located elsewhere, to process image data from sensors 910 and provide the requisite visual feedback. The surface of keys 915 can be antimicrobial to provide an extra level of protection. In one embodiment, for example, the display area encompassing keys 915 is covered by antimicrobial Corning® Gorilla® Glass 3, a chemically strengthened glass infused with silver ions.

Figure 9B:
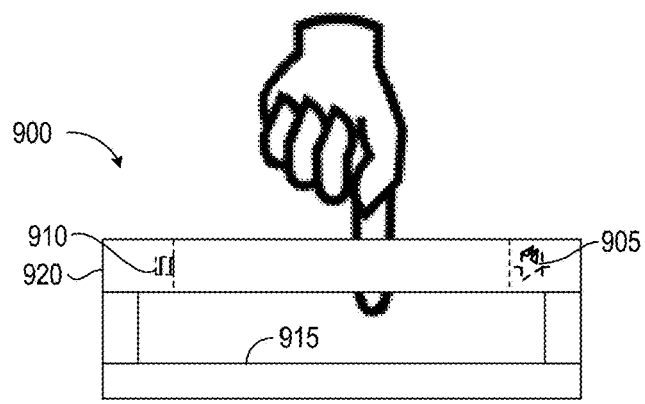
FIG. 9B is a side view of an embodiment of keypad 900 of FIG. 9A.

FIG. 9B is a side view of an embodiment of keypad 900 of FIG. 9A. Image sensor 910 can be two-dimensional sensors, as detailed previously, but are one-dimensional in this example. When a finger extends through a frame 920, the finger breaks the beams emitted by LEDs 905 and, by binocular disparity, data from image sensors 910 is used to locate the finger in the two-dimensional space over keys 915. In this and other embodiments, the number of active pixels in each imaging sensor can be reduced in a low-power "sentinel" mode while keypad 900 awaits interaction.

Figure 9C:
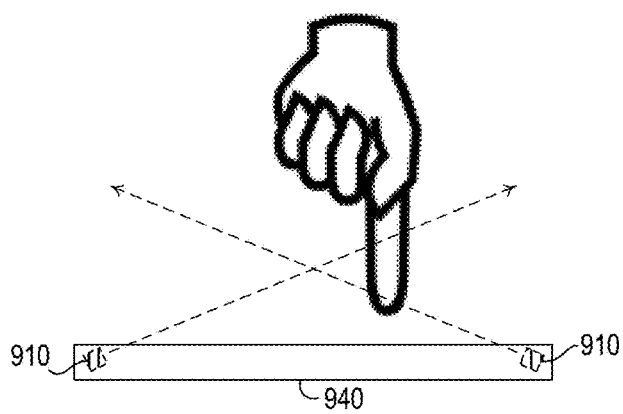
FIG. 9C is a side view of a keyboard 940 in accordance with another embodiment.

FIG. 9C is a side view of a keypad 940 in accordance with another embodiment. Keypad 940 can be similar to keyboard 900 in plan view. One-dimensional imaging devices 910 are angled near or within the display area to define a touchless interface. Illumination sources, such as one or more IR LEDs, can likewise be included within or near the display area. Imaging devices 910 have a wide field of view in the plane substantially parallel to the face of display 940, and a relatively narrow field of view in the dimension normal to the face. The sensed area thus approximates a plane disposed over the face of the display. Imaging devices 910 can remain in a sentinel mode until both imaging devices sense an object, which allows display 940 to ignore activity outside of the space directly above the display area. Two-dimensional imaging devices are used in other embodiments (e.g., similar to what is detailed above in connection with FIGS. 1A-1C).

Figure 10A:
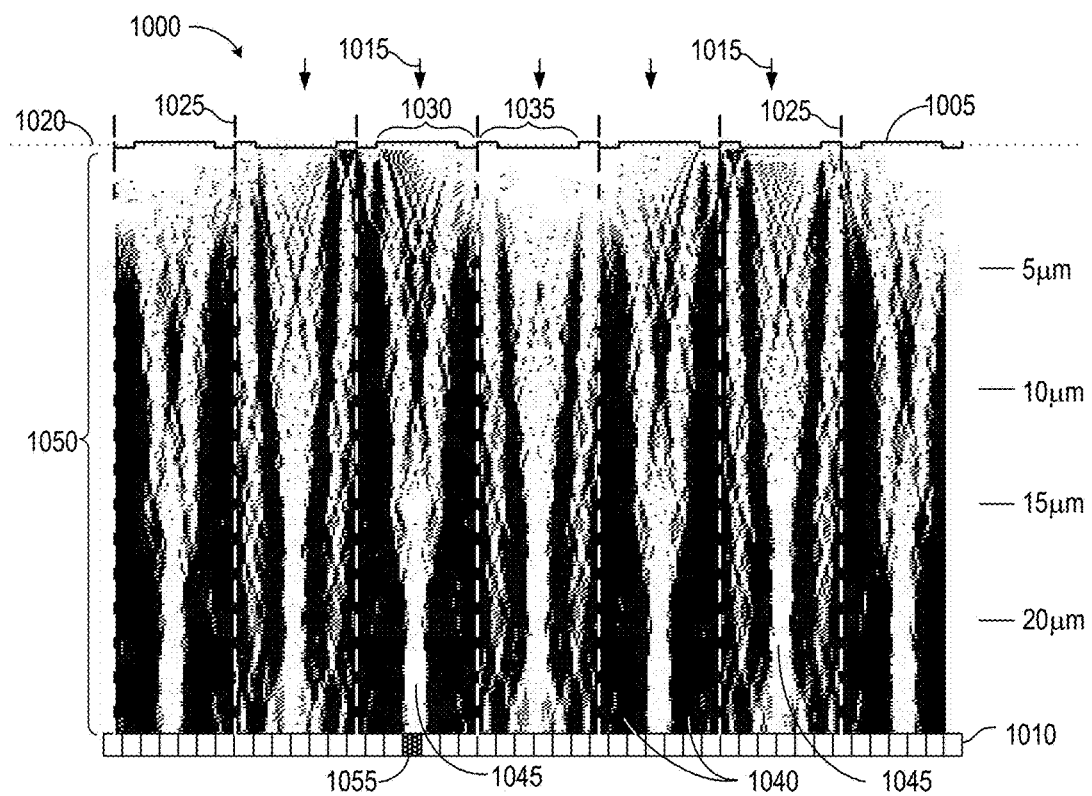
FIG. 10A is a cut-away view of an imaging device 1000 that supports computational diffractive imaging.

FIG. 10A is a cut-away view of an imaging device 1000 that supports computational diffractive imaging. Imaging device 1000 includes a phase antisymmetric grating 1005 overlying a photodetector array 1010, such as a CCD (charge-coupled device), CMOS (complementary metal-oxide-semiconductor) or (in the case of thermal IR detection) a microbolometer sensor. The photodetector array may comprise a lenslet array designed to concentrate incident photons onto the most sensitive areas of the array to increase quantum efficiency. The features of grating 1005 offer considerable insensitivity to the wavelength of incident light in a wavelength band of interest, and also to the manufactured distance between grating 1005 and photodetector array 1010. Grating 1005 produces an interference pattern for capture by array 1010. Digital photographs and other image information can then be extracted from the pattern.

Light in a wavelength band of interest is depicted as striking grating 1005 from a direction 1015 that is normal to a transverse plane 1020 of the grating 1005. Dashed lines 1025 highlight periodic boundaries between regions of phase antisymmetry. Each of these boundaries is a result of features 1030 and 1035 of odd symmetry, and produces a normally arranged curtain 1040 of minimum intensity created by destructive phase interference between adjacent features 1030 and 1035. Curtains 1040 are separated by foci 1045 (curtains of maximum light intensity), and the collection of curtains 1040 and foci 1045 extend from grating 1005 through the body 1050 of device 1000 to produce an interference pattern on photodetector array 1010. In this illustration, the pattern of intensity variations evident in the foci and curtains are near-field spatial modulations that result from near-field diffraction. One photosensitive element 1055 within array 1010 is shaded beneath a focus 1045 to serve as a reference for a subsequent discussion of the sensitivity of device 1000 to the angle of incident light.

The image of FIG. 10A resulted from a simulation of an imaging device with the following parameters and assuming specific parameters. Body 1050 is of fused silica, and is in contact with a conventional photodetector array 1010 with photosensitive elements spaced by 2.2 μm. The top of grating 1005 is an air interface in this example. The relatively small segments of features 1030 and 1035 are about 1 μm, and the relatively larger segments are about 4 μm. These segments generally form transverse plane 1020, which is separated from array 1010 by about 25 μm. Curtains 1040 and foci 1045 are the destructive and constructive interference patterns for 532 nm incident light.

The thickness of body 1050 and lengths of the segments of features 1030 and 1035 were optimized for 400 nm light despite the selection of 532 nm light for the simulation. As a consequence, the tightest focus occurs about 5 μm above array 1010 (at the 20 μm mark), or about a depth of about forty times the wavelength of incident light used for the simulation. The resultant curtains 1040 plainly separate foci 1045 well above and below the 20 μm mark, however, illustrating a robust insensitivity to wavelength within the band of interest. Curtains 1040 are easily distinguished at depths beyond about 10 μm in this example, or about twenty times the wavelength of incident light used in the simulation. The relatively deep and continuous penetration of curtains 1040 also provides considerable manufacturing tolerance for the thickness of body 1050. These advantages obtain because the near-field spatial modulations projected onto array 1010 are substantially wavelength independent over the wavelength band of interest, which means that the adjacent modulations (dark and light) do not reverse signs with changes in wavelength within the band of interest.

Figure 10B:
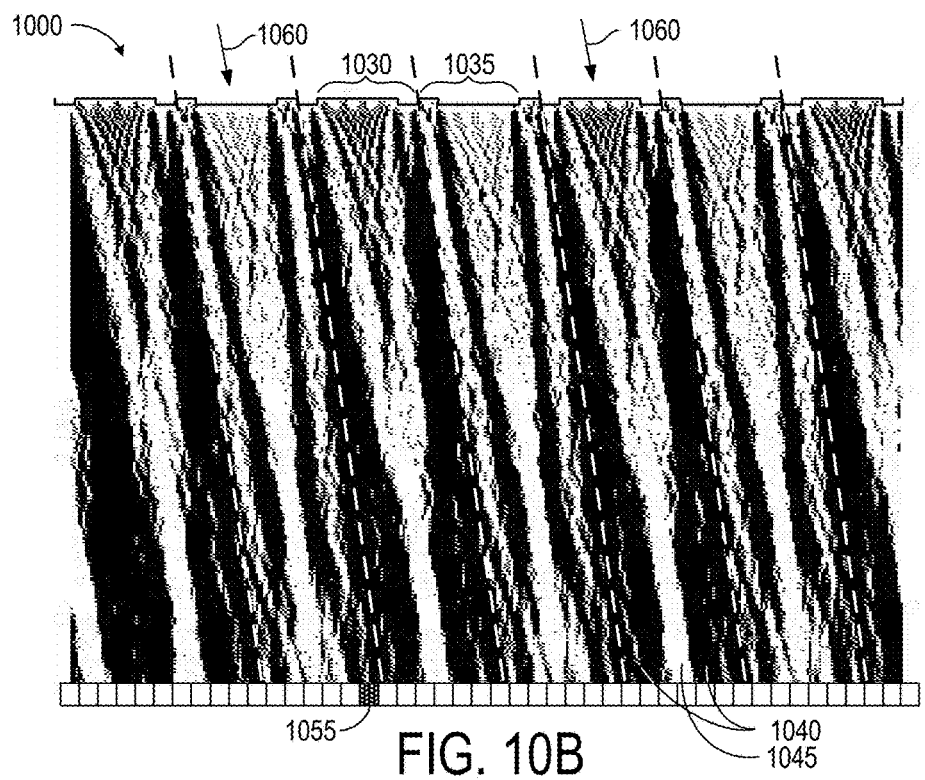
FIG. 10B depicts imaging device 1000 of FIG. 10A simulating light incident plane 1020 at an acute angle 1060 to illustrate the sensitivity of curtains 1040 and foci 1045 to the angle of incidence.

FIG. 10B depicts imaging device 1000 of FIG. 10A simulating light incident plane 1020 at an acute angle 1060 to illustrate the sensitivity of curtains 1040 and foci 1045 to the angle of incidence. Using element 1055 as a reference point, we see that that the foci 1045 that illuminated element 1055 in FIG. 10A have considerably moved to the right in FIG. 10B. Curtains 1040 and foci 1045 extend at an acute angle that relates to angle 1060 according to Snell's law. The separation of foci 1045 by curtains 1040 is maintained. Sensor 1000 is thus sensitive to the angle of incidence.

Each phase antisymmetric structure generates a point-spread response PSR, and the resultant collection of patterns is itself a PSR. As used herein, a "diffraction-pattern generator" is a structure that produces PSRs for light within the wavelength band of interest, and for a range of orientations of interest. In this one-dimensional example, the orientation of interest is perpendicular to the boundaries of odd symmetry.

Figure 11A:
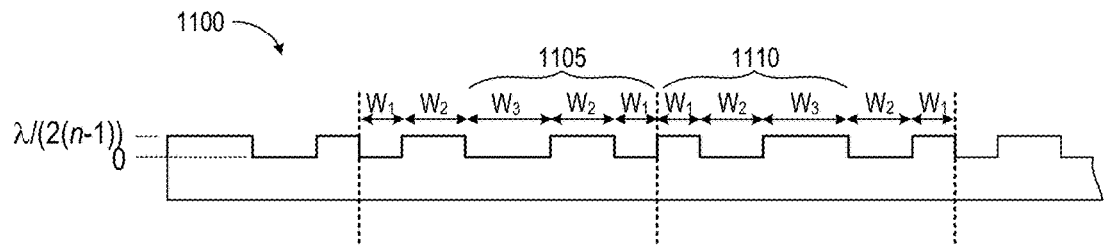
FIG. 11A depicts a one-dimensional, binary phase antisymmetric grating 1100 in accordance with one embodiment.

FIG. 11A depicts a one-dimensional, binary phase antisymmetric grating 1100 in accordance with one embodiment. The upper features of grating 1100 are at a height $\lambda/(2(n-1))$, sufficient to induce one-half wavelength of retardation in the band of interest relative to lower features, or $\pi$ radians of relative phase delay. Features 1105 and 1110 on either side of each boundary exhibit odd symmetry with three differently sized segments, from narrowest to widest $W_1$, $W_2$, and $W_3$. With this arrangement, paired segments (e.g., adjacent segments of width $W_1$ within adjacent features 1105 and 1110) induce respective phase delays that differ by approximately half a wavelength over the wavelength band of interest.

Figure 11B:
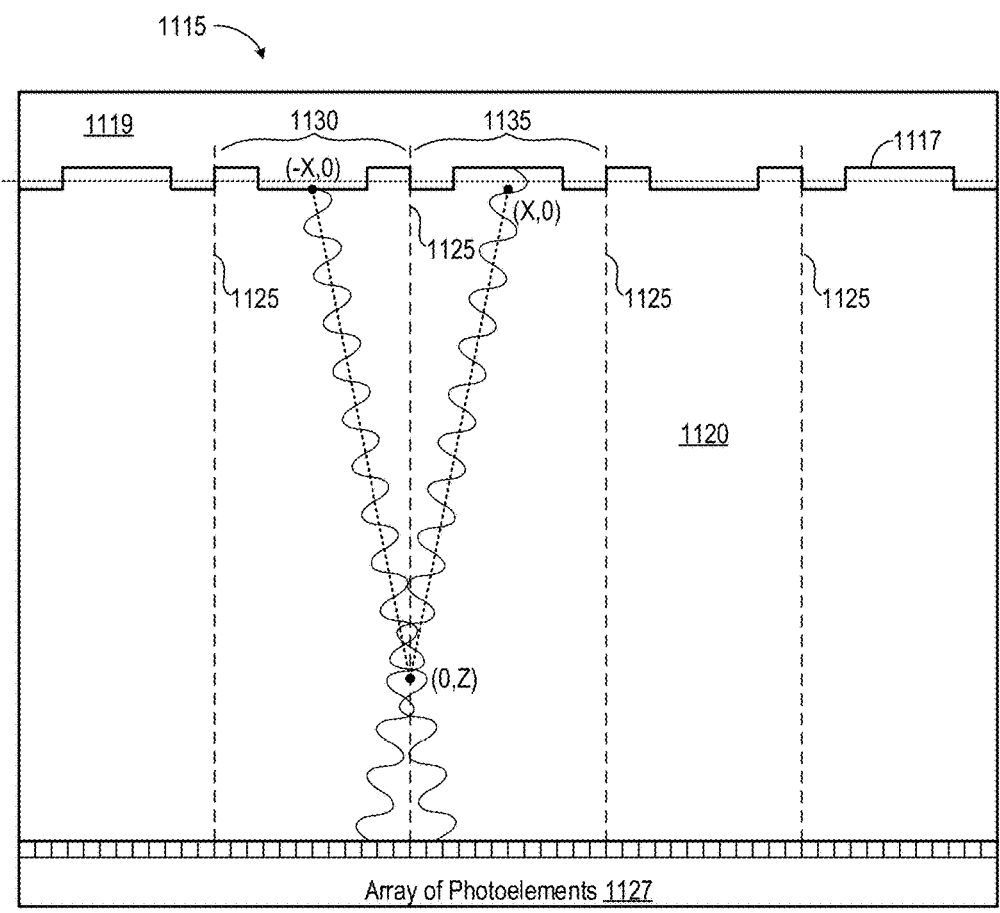
FIG. 11B depicts an imaging device 1115 in accordance with an embodiment in which a binary, phase antisymmetric grating 1117 is formed by an interface between light-transmissive media of different refractive indices.

FIG. 11B depicts an imaging device 1115 in accordance with an embodiment in which a binary, phase antisymmetric grating 1117 is formed by an interface between light-transmissive media of different refractive indices, a polycarbonate layer 1119 and optical Lanthanum dense flint glass 1120 in this example. Each of four boundaries of odd symmetry 1125 is indicated using a vertical, dashed line. As in the foregoing examples, the upper features of grating 1117 induce phase retardations of half of one wavelength ($\pi$ radians) relative to lower features. Features 1130 and 1135 on either side of each boundary 1125 exhibit odd symmetry.

Due to dispersion, the difference in the refractive index of polycarbonate layer 1119 and Lanthanum dense flint glass layer 1120 is an increasing function of wavelength, facilitating a wider wavelength band of interest over which the phase delay is approximately $\pi$ radians. These elements produce an interference pattern on an analyzer layer 1127 (e.g., a CMOS or CCD image sensor).

This example assumes light incident the light interface of device 1115 is normal to the transverse plane of phase grating 1117, in which case light fields that enter grating 1117 equidistant from a one of the boundaries of odd symmetry 1125, such as at locations (-X,0) and (X,0), are out of phase at points beneath grating 1117 (e.g., point (0,Z)), and thus destructively interfere to produce curtains of minimum intensity (e.g., curtains 1040 of FIGS. 10A and 10B). Neither the depth Z nor the wavelength of light over a substantial spectrum significantly influences this destructive interference. Constructive interference similarly produces foci of maximum intensity (e.g., foci 1045 of FIGS. 10A and 10B). Both the high and low features admit light, which provides relatively high quantum efficiency relative to gratings that selectively block light.

Figure 12A:
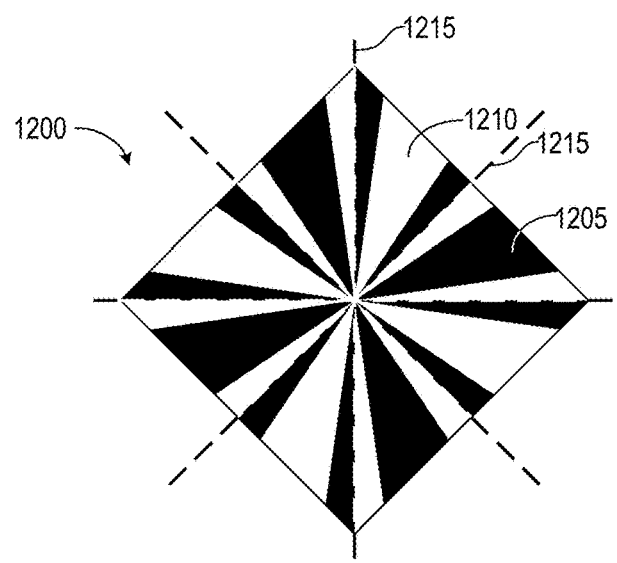
FIG. 12A is a plan view of a sensor 1200 in accordance with another embodiment.

FIG. 12A is a plan view of a sensor 1200 in accordance with another embodiment. Relatively high segments 1205 and low segments 1210 on either side of each of eight boundaries of odd symmetry 1215 create a grating in which the widths of the segments increase with distance from the center of the sensor. For a given focal depth, light of higher frequencies tends to produce a sharper focus with narrower feature widths. Sensor 1200 can therefore be optimized such that the central portion of the grating is optimized for collection of relatively higher frequency light, and the peripheral area for collection of relatively lower frequency light.

Figure 12B:
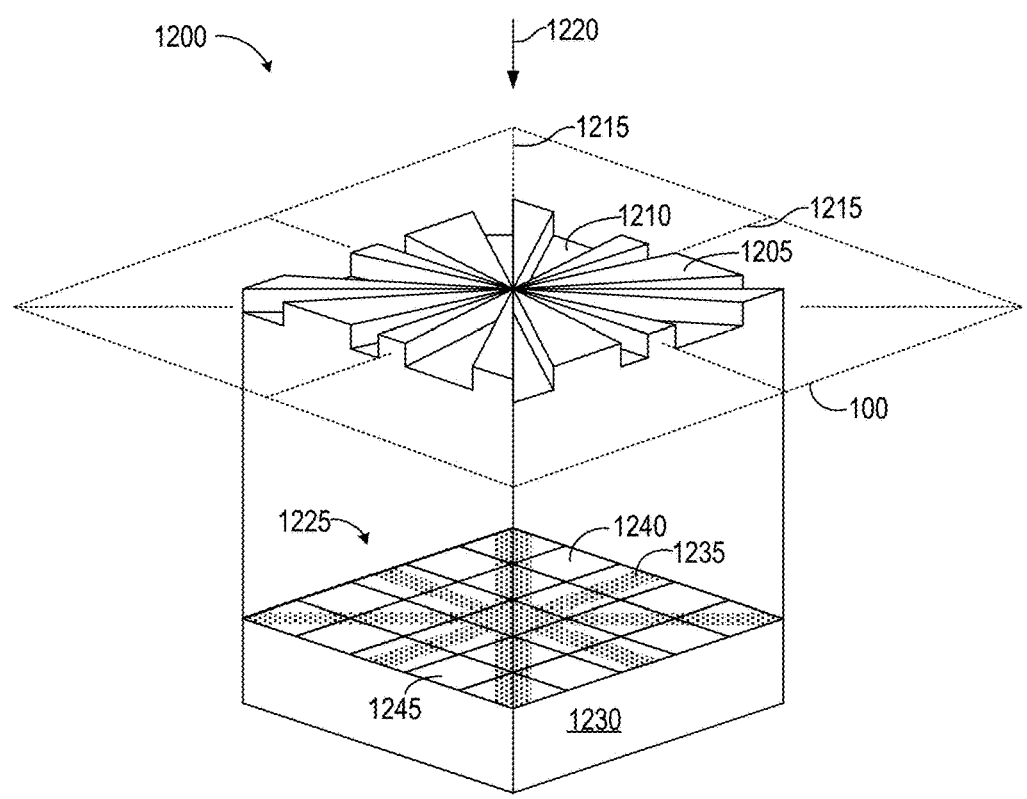
FIG. 12B is a three-dimensional perspective of sensor 1200 of FIG. 12A, and shows how light 1220 from a direction normal to the grating surface casts an interference pattern 1225, a PSR, on an underlying photodiode array 1230.

FIG. 12B is a three-dimensional perspective of sensor 1200 of FIG. 12A, and shows how light 1220 from a direction normal to the grating surface casts an interference pattern 1225, a PSR, on an underlying photodiode array 1230. Curtains and foci, as detailed previously, respectively cast shadows 1235 and bright shapes 1240 to be sensed by individual photosensitive elements 1245 of array 1230. Array 1230 captures a digital representation of pattern 1225.

Figure 13A:
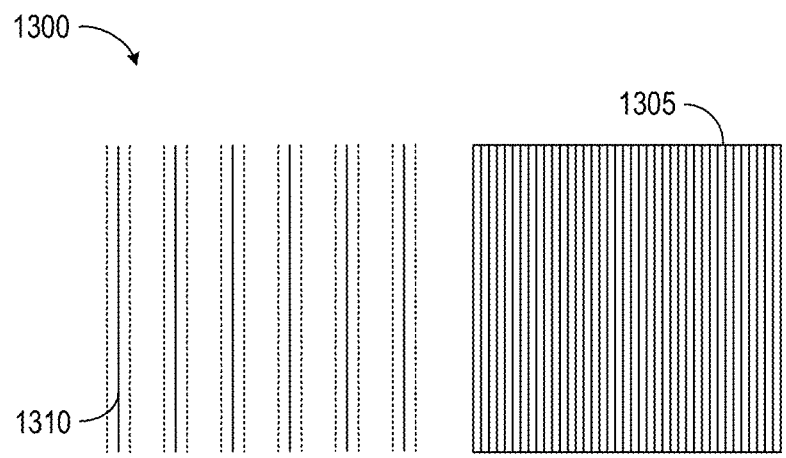
FIG. 13A depicts a grating 1300 and associated photodiode array 1305.

FIG. 13A depicts a grating 1300 and associated photodiode array 1305. Grating 1300 has parallel odd-symmetry boundaries 1310, which may have features of the same or different widths, or of varying widths along one or more boundaries. Parallel boundaries with the requisite diversity of widths and spacings to sample a sufficient number of spatial frequencies can image one-dimensional images, e.g., an extend finger, as in the example of FIGS. 9A and 9B, or barcodes. Array 1305 is shown alongside, rather than below, grating 1300 to highlight the linear photosensitive elements in this embodiment. While a two-dimensional array can be used, the longer pixels in this one-dimensional photodiode array 1305 increase light sensitivity, improve the signal-to-noise ratio by integrating more light signal per pixel, and reduce the number of data points and relating signal processing.

Figure 13B:
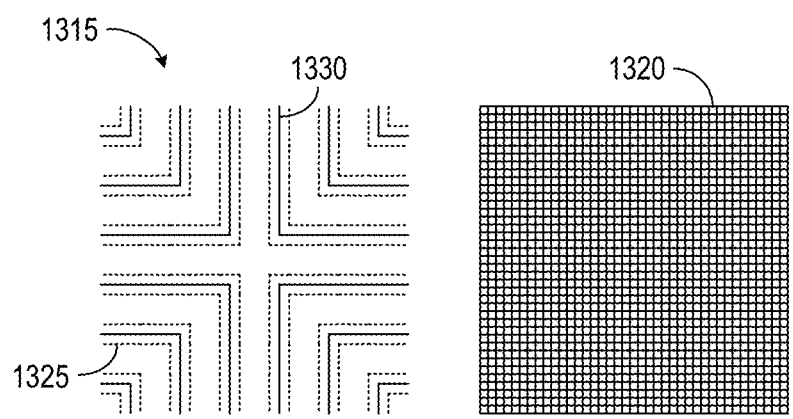
FIG. 13B depicts a grating 1315 and associated photodiode array 1320.

FIG. 13B depicts a grating 1315 and associated photodiode array 1320. Grating 1315 has parallel, right-angled boundaries 1330, which may have features of the same or different widths, or of varying widths along one or more boundaries. Parallel boundaries with the requisite diversity of widths and spacings along two dimensions to sample a sufficient number of spatial frequencies can image e.g. point sources, such as to identify the position of the sun or of an illuminated fingertip.

The above-described systems and methods for gesture recognition have many applications other than smart watches. These include other types of mobile devices; toys (e.g. simple gestures to turn on/off and otherwise interact with and control the state of a toy); appliances (e.g. touchless wall-mounted light switches, desk lamps, and kitchen appliances); automobile accessories (e.g., radio, air conditioner, turn signals); game interfaces; kiosks and digital billboards and advertisements (e.g., to navigate pages, or to select merchandise or product configurations); eReaders (e.g. page advance or switch on or off); or touchless typing (e.g., keyboards on non-traditional surfaces such as tabletops). These systems and methods can also be used for automotive user interfaces to interpret hand and facial gestures, with feedback provided via e.g. a dashboard or heads-up display.

While the subject matter has been described in connection with specific embodiments, other embodiments are also envisioned. For example, the wavelength band of interest can be broader or narrower than the visible spectrum, may be wholly or partially outside the visible spectrum, and may be discontinuous. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A wearable computer comprising:
a display to present an image;
a touchscreen to sense tactile input from a human finger;
an optical grating having adjacent features that diffract incident light reflected off the human finger into curtains of minimum intensity separated by foci;
an image sensor in a path of the curtains and the foci, the curtains and foci extending to the image sensor, the image sensor to capture patterns of the curtains and the foci; and
at least one processor to detect a remote gesture from the patterns of the curtains and the foci captured by the image sensor, to alter the image responsive to the detected remote gesture, to detect a tactile gesture from the sensed tactile input, and to alter the image responsive to the detected tactile gesture.

2. The computer of claim 1, each of the patterns of the foci responsive to a point source having a maximum dimension M, the image sensor having pixels spaced by a pitch P less than the maximum dimension M.

3. The computer of claim 1, further comprising a light source to emit the light to be reflected off the human finger.

4. The computer of claim 3, wherein the emitted light is infrared light.

5. The computer of claim 1, further comprising a second optical grating to split and diffract the incident light into second foci, and a second image sensor in a path of the second foci, the second image sensor to capture second patterns of the second foci.

6. The computer of claim 1, wherein the image sensor comprises a one-dimensional array of photosensitive elements.

7. A method comprising:
diffracting incident light from a human finger using an optical phase grating that diffracts the incident light into curtains of minimum intensity separated by foci to produce an interference pattern;
capturing the interference pattern with a photodetector array, the curtains of minimum intensity and the foci extending to the photodetector array;
detecting a remote gesture from the captured interference pattern;
displaying an image responsive to the detected remote gesture;
detecting a tactile gesture on the image; and
altering the image responsive to the tactile gesture.

8. The method of claim 7, wherein detecting the tactile gesture comprises sensing the tactile gesture on a tactile interface.

9. The method of claim 7, wherein detecting the remote gesture comprises splitting incident light and capturing a pattern of the split light.

10. The method of claim 9, wherein detecting the tactile gesture comprises sensing the tactile gesture on a tactile interface, and wherein detecting the remote gesture comprises calculating, from the pattern, a distance between the tactile interface and an imaged object.

11. The method of claim 9, wherein detecting the remote gesture comprises comparing the pattern with a gallery of reference patterns.

* * * * *